US012168569B2

(12) United States Patent
Evans et al.

(10) Patent No.: US 12,168,569 B2
(45) Date of Patent: Dec. 17, 2024

(54) RESIDENTIAL CONTAINER GUIDES FOR A FRONT END LOADER

(71) Applicant: The Heil Co., Chattanooga, TN (US)

(72) Inventors: Eric Evans, Fort Payne, AL (US); Tracy Mason, Mentone, AL (US); Bryan Stewart, Chattanooga, TN (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 18/460,268

(22) Filed: Sep. 1, 2023

(65) Prior Publication Data

US 2023/0406618 A1 Dec. 21, 2023

Related U.S. Application Data

(62) Division of application No. 17/448,177, filed on Sep. 20, 2021, now Pat. No. 11,787,629.

(60) Provisional application No. 63/081,194, filed on Sep. 21, 2020.

(51) Int. Cl.
*B65F 3/04* (2006.01)
*B65F 3/02* (2006.01)

(52) U.S. Cl.
CPC ...... *B65F 3/041* (2013.01); *B65F 2003/0223* (2013.01); *B65F 2003/0279* (2013.01)

(58) Field of Classification Search
CPC .............. B65F 3/041; B65F 2003/0223; B65F 2003/0279
See application file for complete search history.

(56) References Cited

U.S. PATENT DOCUMENTS

| | | | |
|---|---|---|---|
| 3,090,512 | A | 5/1963 | Dempster et al. |
| 3,112,834 | A | 12/1963 | Dempster et al. |
| 4,547,118 | A | 10/1985 | Pittenger |
| 4,699,557 | A | 10/1987 | Barnes |
| 7,063,495 | B1 | 6/2006 | Johnson |
| 7,210,890 | B2 | 5/2007 | Curotto et al. |
| 7,553,121 | B2 | 6/2009 | Curotto et al. |
| 9,809,383 | B2 | 11/2017 | Ford |
| 9,926,134 | B2 | 3/2018 | Ford |
| 2022/0089366 | A1 | 3/2022 | Evans et al. |
| 2023/0356933 | A1 | 11/2023 | Fraas et al. |

*Primary Examiner* — Jonathan Snelting
(74) *Attorney, Agent, or Firm* — Fish & Richardson P.C.

(57) ABSTRACT

A refuse vehicle has a Commercial and a Residential Mode whereby when in Commercial Mode, stops or fins, utilized in Residential Mode to assist in securing a residential container laterally at the front of the vehicle, are adjustable to prevent contact or interference with the cab protector or other portions of the vehicle when in Commercial Mode. The fins may be located and/or rotated, such as at least 30 degrees (from position to position) or above a horizontal or otherwise intermediate the residential and commercial configurations. The fins may preferably be located above a bottom of the crossbar when moving through the dumping cycle so as not to contact the cab protector in Commercial Mode. Preferably, the fins may also be housed on the residential refuse container rather than along the crossbar.

20 Claims, 7 Drawing Sheets

RESIDENTIAL CONTAINER GUIDES FOR A FRONT END LOADER

CROSS-REFERENCE TO RELATED APPLICATIONS

This application is a divisional of U.S. patent application Ser. No. 17/448,177, entitled "Residential Container Guides For A Front End Loader," filed Sep. 20, 2021, which claims the benefit under 35 U.S.C. § 119(e) of U.S. Provisional Patent Application No. 63/081,194, entitled "Residential Container Guides For A Front End Loader," filed Sep. 21, 2020, which are incorporated herein by reference in their entirety.

TECHNICAL FIELD

The present invention relates to a refuse collection vehicle with a front end loading configuration having an arm assembly configured to lift refuse receptacles with first and second forks to dump into a hopper normally behind the cab on the chassis of the vehicle, with the capability of swapping between residential and commercial containers, if not modes, preferably without the use of tools or removal of additional parts and without damaging the vehicle.

BACKGROUND

Front end loading refuse collection vehicles (RCVs) have been in operation for years. Front end loading RCVs are typically used for commercial refuse collection, where large bins of garbage or recyclables are engaged with the front forks of the vehicle and lifted overhead to be emptied into a hopper behind the cab of the vehicle. U.S. Pat. Nos. 7,210,890 and 7,553,121, which are incorporated by reference in their entirety herein, describe a residential refuse collection device which can be positioned on the front forks of a front end loading RCV. This residential refuse collection device is equipped with a side loading arm which dumps residential bins into its container. Once the container is sufficiently filled, the device is lifted and dumped into the hopper behind the cab of the vehicle in nearly the same manner as a commercial container would be emptied by the front loading RCV. This residential refuse collection device is sold under the brand Curotto-Can®. Other types of residential collection devices exist, and these devices may also make use of incorporated side loading arms, or front loading grippers, or cart-tipper panels secured at various locations, or other means of emptying residential bins into the device container carried by a front loading RCV.

Currently, in order to locate and secure a residential refuse collection device at a desired position adjacent to the front of the cab, brackets (sometimes called fins) are permanently welded to the rear or back side of the fork assembly crossbar of the vehicle lift arms. The guides and fins cooperate so that the residential collection device can be secured in a desired first position. Together, the guides and fins also prevent side to side movement of the collection device and the lift arms during residential collection operations. Based on the uniform geometry of residential refuse collection devices, a front loading RCV that is configured to use such a residential refuse collection device will automatically position the refuse collection device during lifting and dumping in a way which ensures that the guides do not make contact with the vehicle. Lifting the refuse collection device with this automatic positioning is called Residential Mode. When operating in Residential Mode, the processor of the RCV controls the fork rotation with interlocks so that the guides are prohibited from contacting the vehicle.

Commercial containers have geometry that is sufficiently distinct from the residential collection devices such that commercial containers cannot be lifted in Residential Mode, and unlike the residential refuse collection devices, commercial containers can also vary in geometry amongst themselves (i.e., commercial containers are not uniform). As a result, when lifting commercial containers, a driver must switch the RCV to Commercial Mode so that the container can be angled differently during the lift operation than it would be in Residential Mode. However, when lifting containers in Commercial Mode, the guide fins can come into contact with the unit's cab protector, the cab itself, and/or the cab windshield in an undesired manner, for example due to a reduced number of interlocks in Commercial Mode, causing damage to the vehicle and/or the container. Since the brackets or fins are normally permanently welded on the back side of the fork assembly, vehicle operators are sometimes unable prevent such damage when leveling commercial containers during a dump cycle in Commercial Mode. For example, the commercial containers often have higher fork pockets and taller sidewalls than residential refuse collection devices. As such, if a commercial container requires leveling (for example, to prevent garbage from falling out of a commercial container) as the commercial container reaches windshield height, this leveling may result in positioning the fins in a way that causes unwanted contact with the cab protector, cab, or windshield during the rotation to dump. Summary Accordingly, it is an object of embodiments of the present disclosure to provide a front end loading refuse vehicle having a Residential Mode and a Commercial Mode where there is no interference with portions of the vehicle when operating the vehicle using the Residential Mode or the Commercial Mode.

It is another object of embodiments of the present disclosure to provide an improved front end loading refuse collection vehicle having guides which may cooperate with fins of an arm assembly and which do not interfere with the operation of the arm assembly when in a Commercial Mode dumping commercial refuse containers into the vehicle hopper.

It is another object of embodiments of the present disclosure to provide fins directly on residential refuse containers (e.g., without providing fins on the crossbar of a lift) to assist in positioning the residential refuse container in a first position, such as when loading residential cans, in order to resist lateral movement of the residential container relative to the chassis of the vehicle.

Accordingly, a first preferred embodiment provides a refuse collection vehicle with a hopper for receiving waste coupled to the chassis of the refuse collection vehicle behind a cab of the vehicle. A lift is coupled to the chassis near the front of the hopper, the lift comprising an arm assembly. The arm assembly is coupled to the chassis at a proximal end, and has first and second opposing arms usually connected at their distal end by a crossbar. The arm assembly is configured to lift a refuse container after engaging the container via a fork assembly, having first and second forks, the fork assembly likewise coupled to the distal end of the arm assembly. A first fin or stop assembly has a first fin or stop normally operably coupled to the crossbar for at least some embodiments. A second fin or stop assembly having a second fin or stop may be provided as well, likewise normally operably coupled to the crossbar.

The refuse vehicle of the first preferred embodiment provides a Residential Mode configuration wherein the first fin or stop of the first fin assembly is directed rearwardly toward the chassis. The first fin is restrained from movement in a first direction extending parallel to the crossbar (such as along an axis of the crossbar) by a first guide connected to and extending forward of the chassis at a bottom of or below the cab. The refuse vehicle also has a Commercial Mode configuration, wherein the first fin of the first fin assembly is positioned, if not repositioned, relative to the crossbar at least 30° in difference from its position in the Residential Mode configuration (if not 30° above a horizontal plane extending through the crossbar). Preferably the first fin can also be positioned and/or repositioned to other angle measurements, such as 45° or 90° or more, for at least some embodiments in the Commercial Mode configuration.

Normally, repositioning for at least many of the preferred embodiments occurs through rotation. Some embodiments may locate fins or stops where they do not make undesirable contact with the vehicle when lifting in Commercial Mode without a need to reposition when in Commercial Mode, while still assisting to secure a residential container for collection operations when in Residential Mode.

A first pin such as a spring loaded pin can secure the first fin assembly in a locked configuration in both the Residential and Commercial configurations for at least some embodiments. A first bumper guide of the vehicle can contact the fin or stop on the crossbar and be a first guide. A second bumper guide can also be a second guide for use in contacting a second fin of a second fin assembly as is described in further detail below.

Specifically, a second fin assembly, if utilized, may or may not be similar to the first fin assembly and may be operably coupled to the crossbar. The second fin assembly can also have a Residential Mode configuration wherein the second fin is restrained from movement by a second guide connected to the chassis in a second direction which extends directly opposite to the first direction, which may be parallel to a crossbar axis. When the refuse vehicle is in Commercial Mode, the second fin preferably repositions to (if it is not permanently fixed in) a Commercial Mode configuration relative to the crossbar, possibly similarly to the first fin, such as at least 30° from the Residential Mode configuration (or above a horizontal plane extending through the crossbar, or at least above a bottom of the crossbar when in the dumping process) and the second fin may rotate or otherwise be moved, if so desired, intermediate the Residential and Commercial configurations relative to the crossbar, similarly or dissimilarly to the first fin.

In a second embodiment, it may also be possible to provide guides and stops for fins which do not necessarily rotate, but also do not contact or interfere with the cab protector and/or surrounding areas, such as by being positioned alternatively so that they extend below a lower surface of the crossbar. For instance, the fin(s) may be located above a bottom surface of the crossbar and/or upwardly angled to thereby prevent interference. In fact, when in the Commercial configuration, the fin(s) may be positioned to extend no lower than a bottom of the crossbar, or other portion closest to the vehicle, through a range of motion as the arms lift and dump the refuse container into the hopper.

In a third embodiment, a crossbar may be provided without fins which is still able to secure a residential collection device when it is in working position in front of the cab. For instance, fin(s) may be directly connected to a rear or lower surface of said collection device rather than being welded or otherwise connected to the crossbar of the lift assembly as they are provided in previous embodiments. The fin(s) may extend rearwardly of the collection device (such as over a container bumper, over the crossbar or otherwise) so as to cooperate with one or more guides, guides which are connected to the chassis in a similar manner as described in previous embodiments. The guide(s) may also extend forwardly from the chassis (such as over a container bumper, crossbar, or otherwise) so as to cooperate with one or more fins. Various combinations of extended fins and/or guides are possible to enable this method on different chassis and arm geometries. Alternatively, one or more fin assemblies may be located near, if not adjacent to, the collection device fork pockets, and potentially contact a container bumper connected to the crossbar when the residential collection device is engaged on the forks. An advantage of this construction is that instead of having guides on the vehicle, which are usually constructed to be laterally adjustable once installed, and which may lead to vibrational looseness or other issues, the guides connected to the chassis could be, for at least some embodiments, fixed in position; adjustment of the guides' fit with the fins could be addressed for at least some embodiments with lateral movement of the fins, such as by selecting which bore of a fin assembly is used for positioning of one or more fins. Other fit adjustment mechanisms will also be possible and understood by someone skilled in the art.

For at least some embodiments of the design, further advantage may be achieved by configuring the system so that when the can is removed, the fins are removed. Additionally, for at least some embodiments, a software program may sense when the residential collection device is removed and automatically remove or disable the Residential Mode arm and/or fork interlocks to enable Commercial Mode without requiring a human input.

For still other embodiments, a residential collection device may be permanently or removably fixed to the arms in a manner other than fork pockets, and this may enable more integrated guide designs, potentially similar in function to the design of dedicated residential collection devices, known and described elsewhere in the art as integrated carry cans.

In another example embodiment, a refuse collection vehicle can include a lift assembly configured to lift a refuse collection device, at least one adjustable fin coupled to the lift assembly, and at least one guide configured to interact with the at least one adjustable fin to restrict movement of the refuse collection device. The at least one adjustable fin can be configured to move between a first position relative to a horizontal plane extending through the crossbar of the lift assembly and a second position relative to the horizontal plane extending through the crossbar of the lift assembly.

In another example embodiment, a refuse collection device includes at least one fin coupled to the lift assembly, and at least one guide configured to interact with the at least one fin to restrict movement of the refuse collection device when the refuse collection device is coupled to a lift assembly of a refuse collection vehicle.

In another example embodiment, a method of securing a refuse collection device in a working position at a front of a refuse collection vehicle includes adjusting a position of at least one fin coupled to at least one of a lift assembly of the refuse collection vehicle or a refuse collection device, wherein the at least one fin is adjusted from a first position to a second position and coupling the refuse collection device to the lift assembly of the refuse collection vehicle, wherein the at least one fin is configured to prevent movement of the refuse collection device in a first direction parallel to an axis extending along a crossbar of the lift assembly.

Accordingly, the applicant presents several solutions to the current problem which may be achieved through the various embodiments of the technology as disclosed herein.

DETAILED DESCRIPTION

Figure 1:
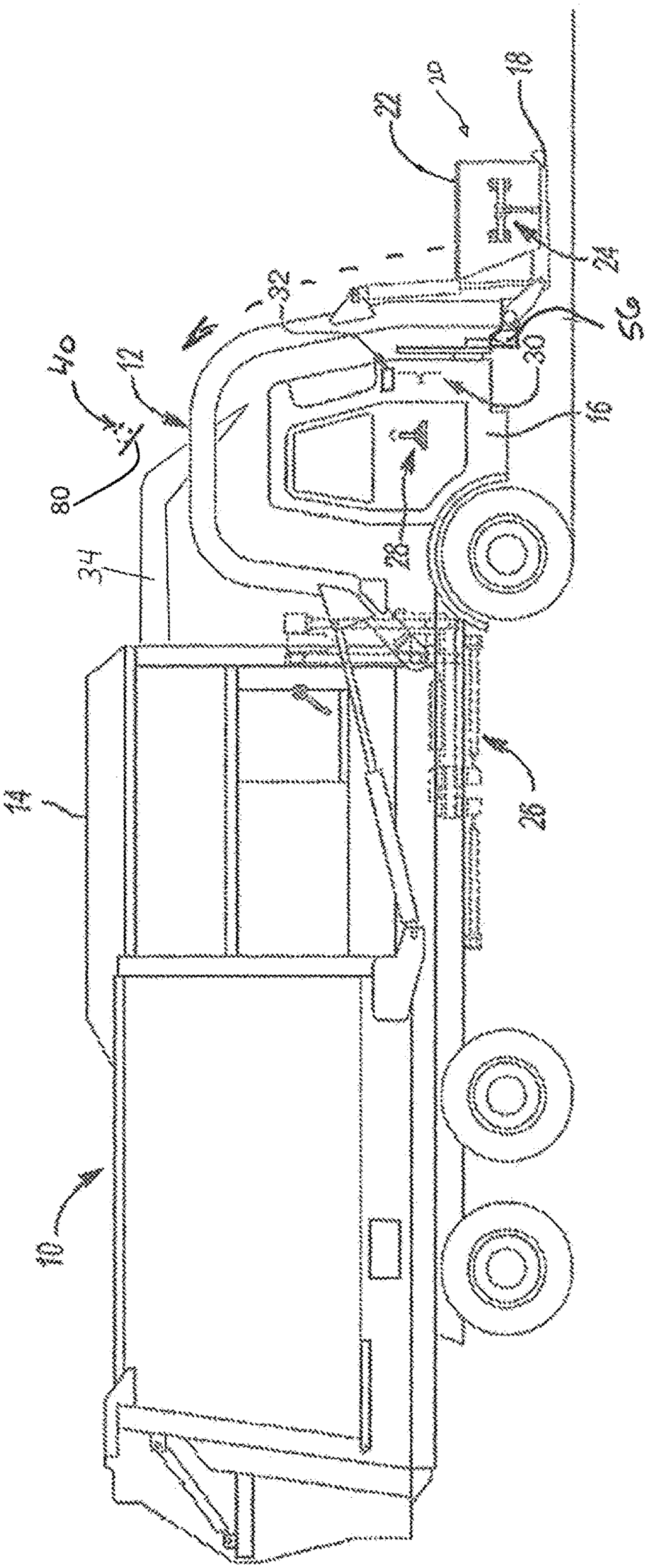
FIG. 1 is a side plan view of a refuse vehicle of an embodiment of the present disclosure.

FIG. 1 depicts a side view of a front end loading refuse vehicle 10 arranged in accordance with various embodiments of the present disclosure. Vehicle 10 is configured as a front loading refuse collection vehicle and includes a front loading lift arm assembly 12 which connects to a front portion of a chassis 26 of the vehicle 10 and extends from behind the operator cab 16 to in front of the operator cab 16. Front loading lift arm assembly 12 includes a fork mechanism 18 which can be deployed to a generally horizontal position for the purpose of engaging a refuse container device 20 by way of corresponding passages, known as fork pockets, equipped on a refuse container device 20. The lift arm assembly 12 and the fork mechanism 18 may be controlled in a street-side driver position or a curbside driver position via a controller mechanism 28. In some embodiments, the controller mechanism 28 may be a remotely mounted controller or a wireless controller.

Once fork mechanism 18 has engaged the container device 20, lift arm assembly 12 is pivoted upwardly and rearwardly to lift and invert container device 20 and direct its contents into vehicle storage 14 via a hopper. The container device 20 can be a carry can loader device and can include a grabber assembly 24, such as a side arm loader.

The vehicle 10 of at least some preferred embodiment has two modes. A first mode is a Residential Mode to be used with a container device 20, as illustrated in FIG. 1, that is specialized for collecting refuse from residential bins. Examples of a specialized residential collection device include the Curotto-Can® and other appropriate front-loading residential carry cans which consist of a container device 20 operable to engage and lift residential bins. One such container device 20 is configured to engage residential bins by means of a grabber assembly 24 and lift and invert the residential bin so its contents are dumped into the container 22 of the container device 20. When the container 22 is sufficiently full, the lift arm assembly 12 lifts the container device 20 to dump its contents into vehicle storage 14, normally located on, or at least coupled to, the chassis 26 of the vehicle 10 rearward of the cab 16. A joystick controller 28 can be used to coordinate such activity. Switches 30 or an operator interface unit (OIU) 32 can be used to control filling the container 22 and/or dumping of the container device 20 into the vehicle storage 14. When in Residential Mode, the vehicle 10 and its processors, such as a portion of OIU 32 and/or other processor(s) coupled thereto, prevents stops or fins 42, 44 on a crossbar 40 of the lift arm assembly 12 from contacting the cab protector 34 during a dump cycle of the container device 20 into the vehicle storage 14 using a series of interlocks.

Figure 2:
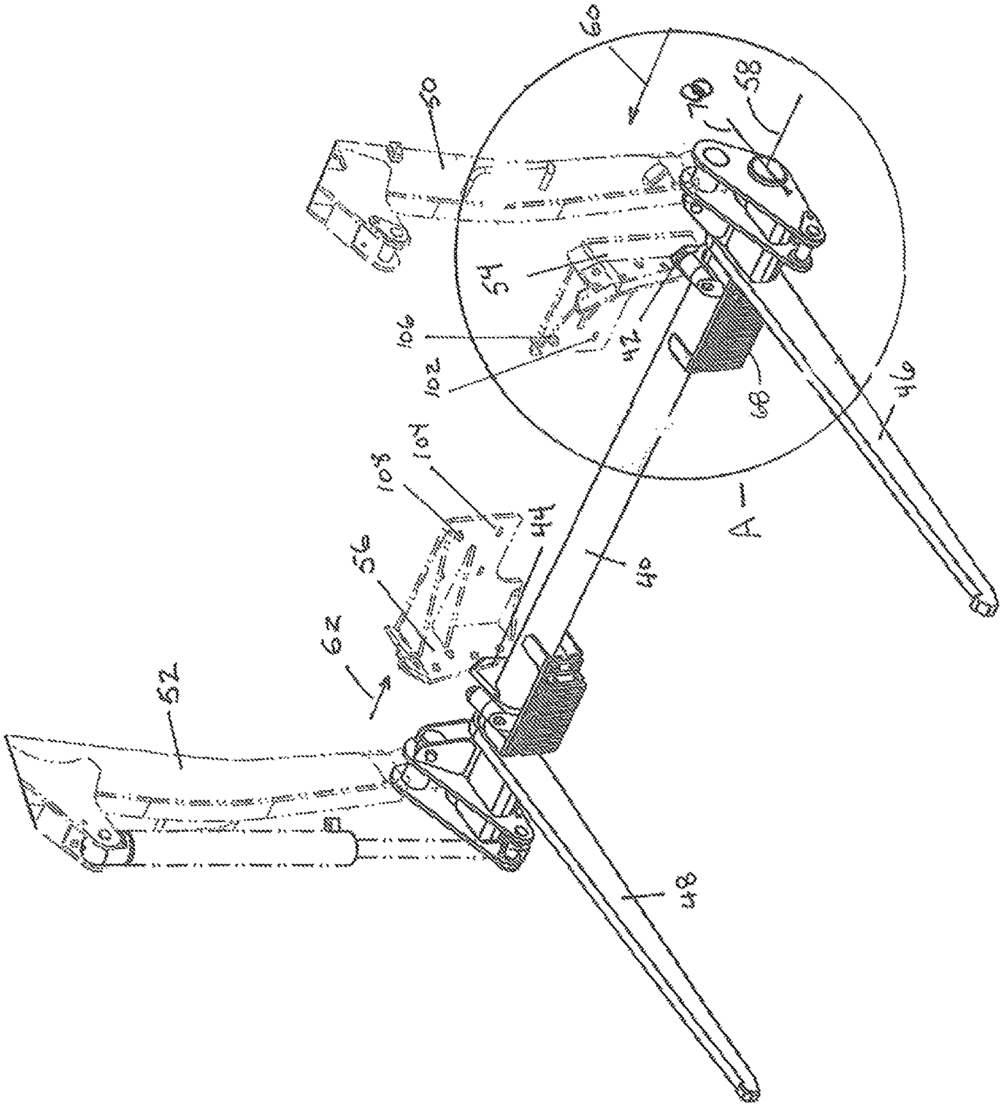
FIG. 2 is a front perspective view of a portion of the vehicle shown in FIG. 1 in a residential mode.
Figure 3:
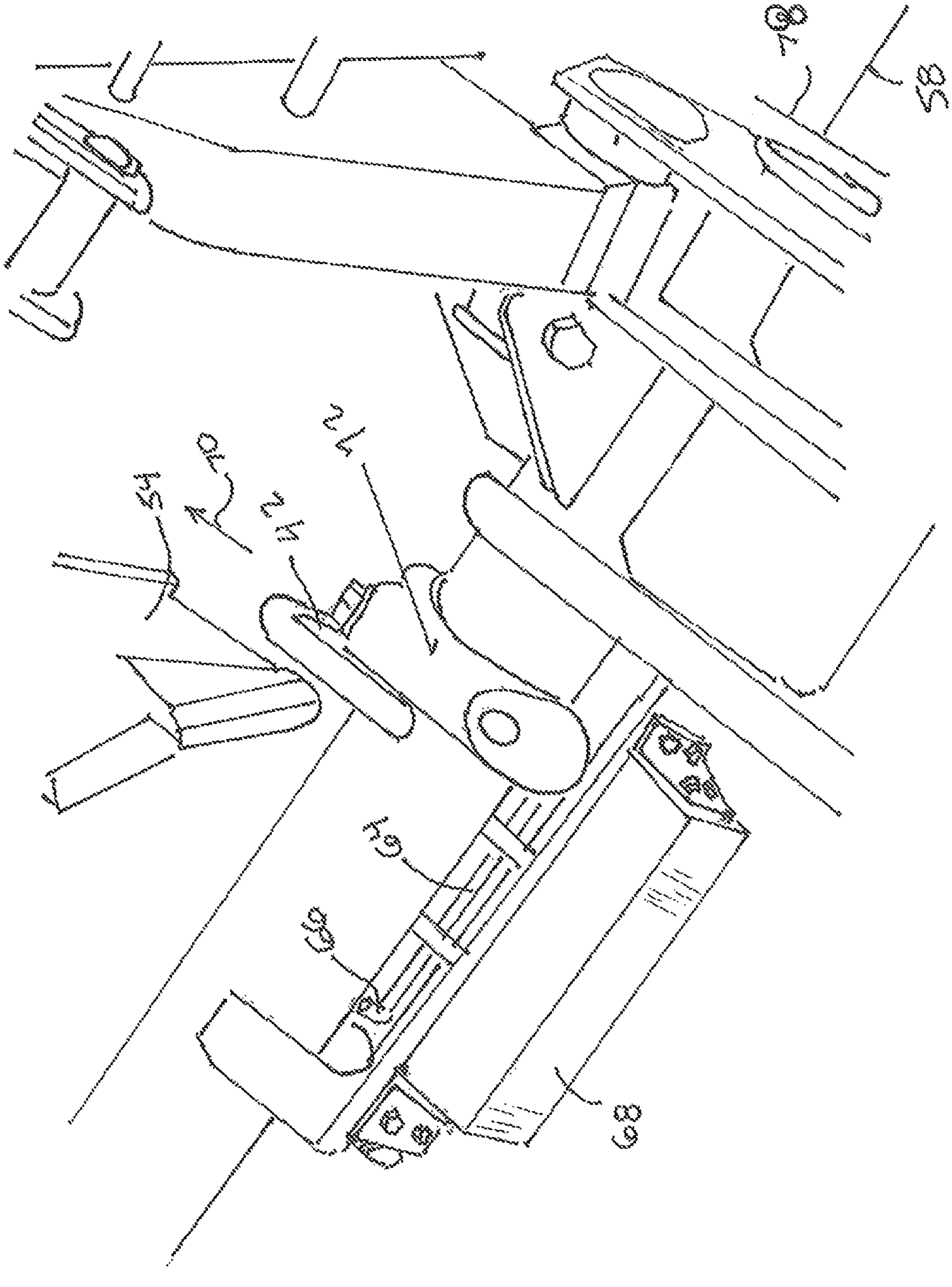
FIG. 3 is a perspective view of Detail A shown in FIG. 2.
Figure 4:
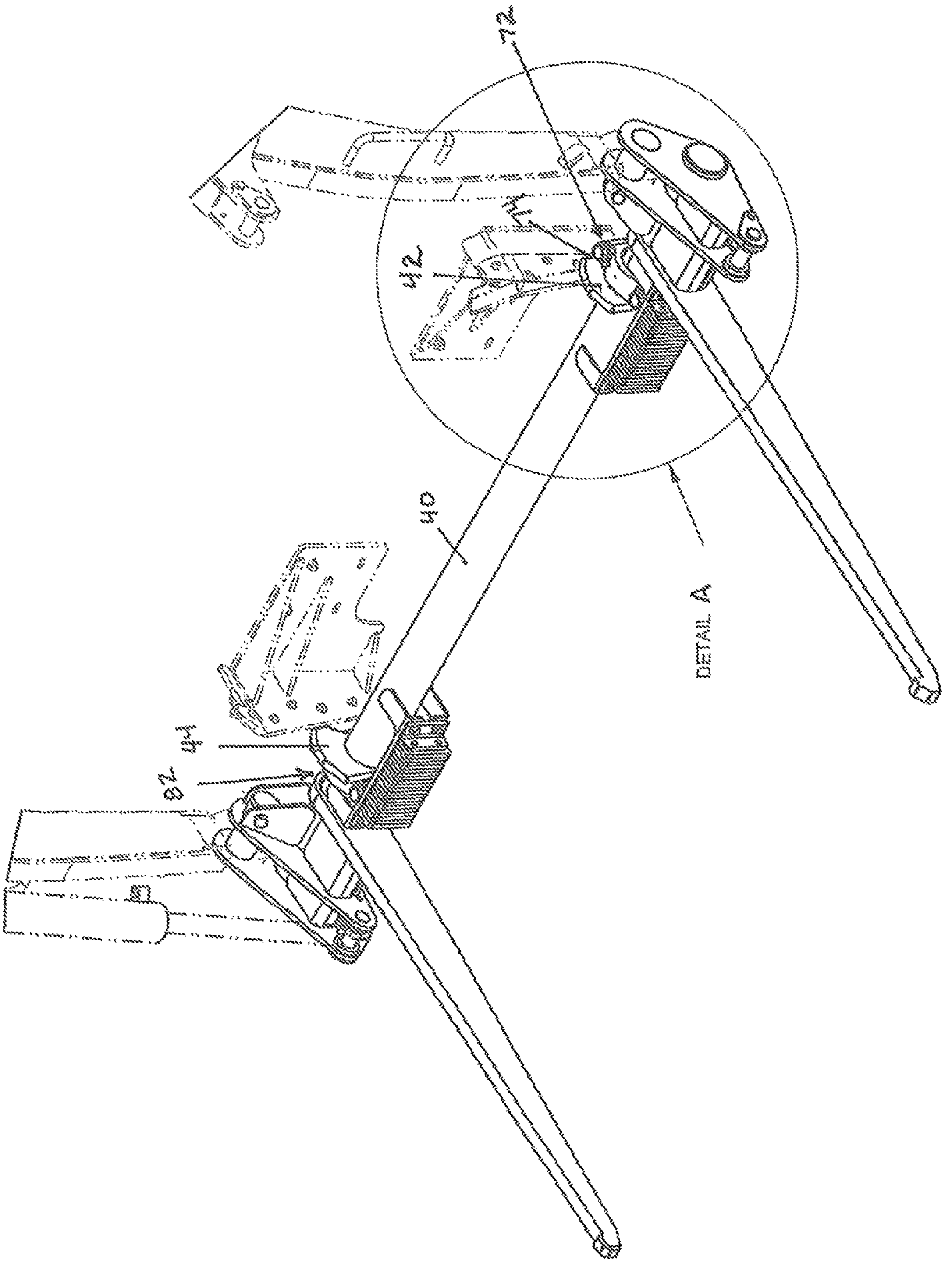
FIG. 4 is a front perspective view of the portion of the vehicle shown in FIG. 2 in a commercial mode.

As depicted in FIG. 2, arm assembly 12 has first and second arms 50, 52 which typically oppose one another about cab 16. Crossbar 40 is often utilized to connect arms 50, 52. As depicted in FIG. 3, first fin assembly 72 has a first fin 42 operably coupled to the crossbar 40. As depicted in FIGS. 2 and 4, a second fin assembly 82 includes a second fin 44 operably coupled to the crossbar 40 as well.

When in Residential Mode, as depicted in FIGS. 2 and 3, a first guide, illustrated as a bumper guide 54, may cooperate with the first fin 42 to resist and/or prevent movement of the container device 20 in a first direction 60 parallel to crossbar axis 58 (e.g., prevents lateral movement of the container device 20). First guide 54 and first fin 42 can also cooperate to resist motion in other directions, such as second direction 62 opposite the first direction 60, or other directions described in further detail herein. The crossbar axis 58 extends axially through a center of crossbar 40, as illustrated in FIG. 2. The second fin 44 can be restrained from movement in a second direction 62 by the second guide or second bumper guide 56. The second direction 62 is directly opposite to the first direction 60 and parallel to the crossbar axis 58 for many embodiments. The second fin 44 and second guide can also cooperate to resist motion in other directions such as first direction 60 and/or others.

When in Commercial Mode, the container device 20 is removed and the forks 46, 48 which engage the container device 20 in Residential Mode are unburdened until they engage a commercial container. When removing the container device 20 during the process of switching between Residential Mode and Commercial Mode, connections to the container device 20 are normally disengaged. Such connections between the container device 20 and the vehicle 10 can be mechanical, electrical, pneumatic, and/or hydraulic and can control dumping refuse into the container 22.

A commercial container is similar to container device 20, but has taller sides than container device 20, includes fork pockets that are located at a different height than those of container device 20, and normally does not include a lift arm grabber assembly 24. As will be described in further detail herein, when the vehicle 10 is switched into a Commercial Mode, such as by switch 30 of processor and/or OIU 32, fins 42, 44 can be adjusted to prevent undesired portions of the vehicle 10, such as the cab protector 34, when dumping the attached commercial container. For example, during the process of switching between Residential Mode and Commercial Mode, the operator can reposition stops or fins 42, 44 based on the selected mode (e.g., Residential Mode vs. Commercial Mode).

FIG. 3 shows Detail A from FIG. 2 with a locking pin 64. Pin 64 can be operated with handle 66. Pin 64 may be spring biased to secure first fin 42 in the residential configuration, as shown in FIG. 3. Fin 42 is illustrated as being directed rearwardly or opposite crossbar 40 from container bumper 68 in rear direction 70.

First fin assembly 72 can rotate or otherwise be repositioned at least 30 degrees, if not at least 45 degrees or 90 degrees (or more), as illustrated in FIG. 4, when switching from Residential Mode to Commercial Mode. First fin 42 may disengage from first guide 54 when not in the commercial configuration with the vehicle 10 in Commercial Mode (e.g., when in the residential configuration for Residential Mode). A bottom 74 of the first fin 42 can be angled at 30 degrees, degrees, or 90 degrees relative to a horizontal axis 78 extending through the centerline or axis 58 of the crossbar 40 for these or other embodiments with the vehicle 10 in Commercial Mode. Pin 64 may engage first fin assembly 72 to secure the first fin 42 in a commercial configuration, such as 90 degrees relative to the residential configuration illustrated in FIGS. 1-2. In some implementations, the first fin assembly 72 is spring biased into such configurations to lock the first fin 42 as illustrated in the residential and commercial configurations.

Crossbar 40 is shown in dotted lines in FIG. 1 when its position along the lift path is closest to the cab protector 34. Bottom 80 of crossbar 40 is illustrated closest to vehicle 10. The first fin 42 is positioned (e.g., rotated) to be seated above the bottom 80 in the commercial configuration.

Second fin assembly 82 may operate similarly as first fin assembly 72 (as illustrated) or dissimilarly from first fin assembly 72. For example, an operator can use handle 66 to disengage pin 64. Once pin 64 has been disengaged using handle 66, the operator can then rotate the first and second fin assemblies 72, 82 between the residential and commercial configurations. Once the first and second fin assemblies 72, 82 are positioned in the residential and commercial configuration, the operator can use handle 66 to reengage the pin 64 to lock the fin assemblies 72, 82 into place and secure the fin assemblies 72, 82 in the desired configuration based on the current mode of the vehicle 10 (e.g., Residential Mode or Commercial Mode).

In some embodiments the fin assemblies 72, 82 are operated differently, such as by having the container device 20 potentially assist in repositioning the fins 42, 44 if installed to a residential configuration or not, possibly automatically when installed. For example, when the container device 20 is removed from the forks 46, 48 or a commercial container is connected to the forks 46, 48, the fins 42, 44 can automatically be positioned in the commercial configuration based on sensors, mechanical, and/or electrical mechanisms, etc. In some implementations, bumper guides 54, 56 can be configured to cooperate with stops or fins 42, 44 in different ways in the Residential Mode such that the stops or fins 42, 44 need not be moved between the residential and commercial configurations when in the Residential and Commercial Modes and can still ensure that the fins 42, 44 will not contact the cab protector 34 (or other portion of vehicle 10) in Commercial Mode, potentially even with at least some interlocks disabled.

Figure 5:
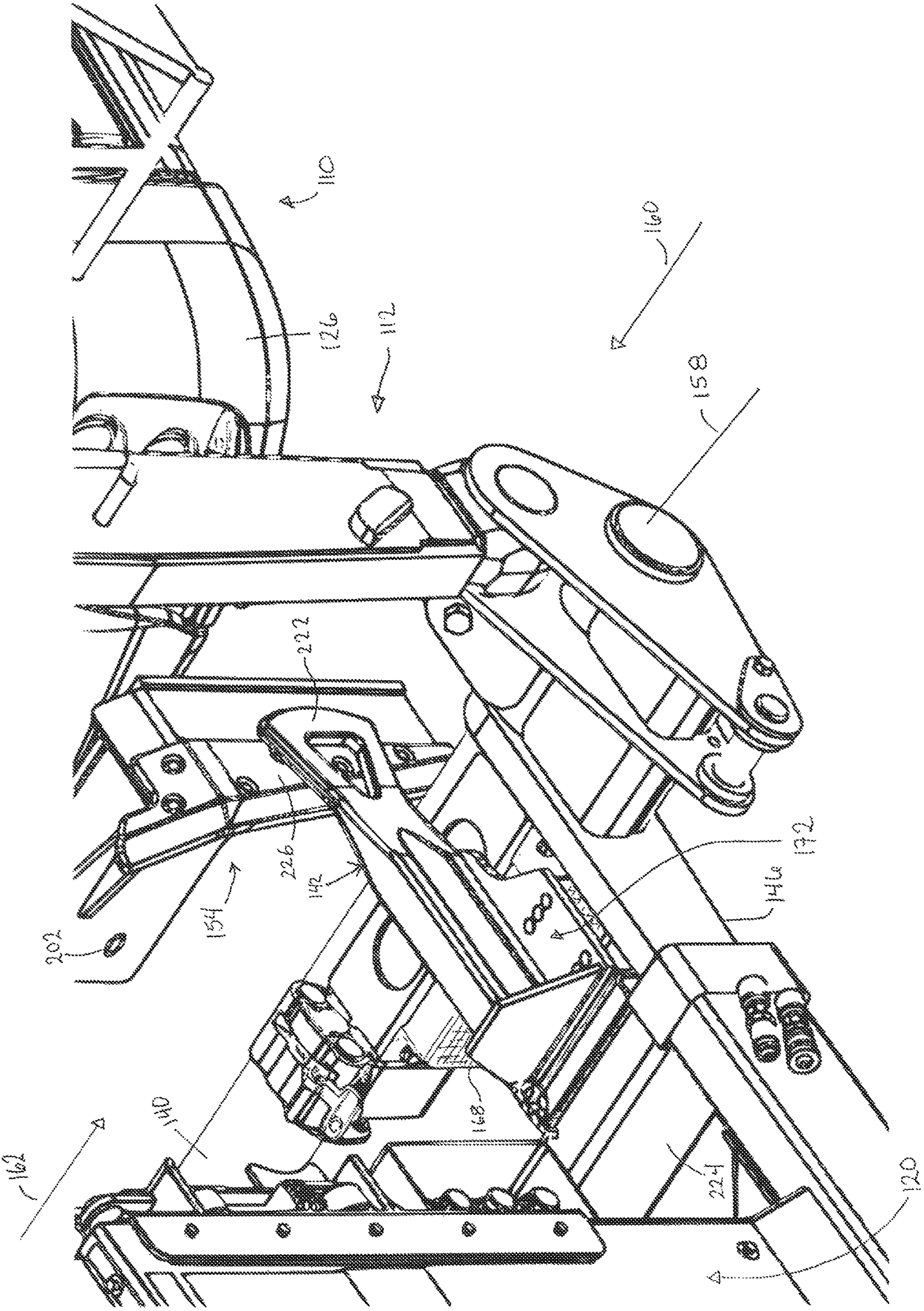
FIG. 5 is a front perspective view of a left-handed portion of another embodiment with an area of detail similar to Detail A of FIG. 2, the right-handed portion being substantially a mirror image thereof.
Figure 6:
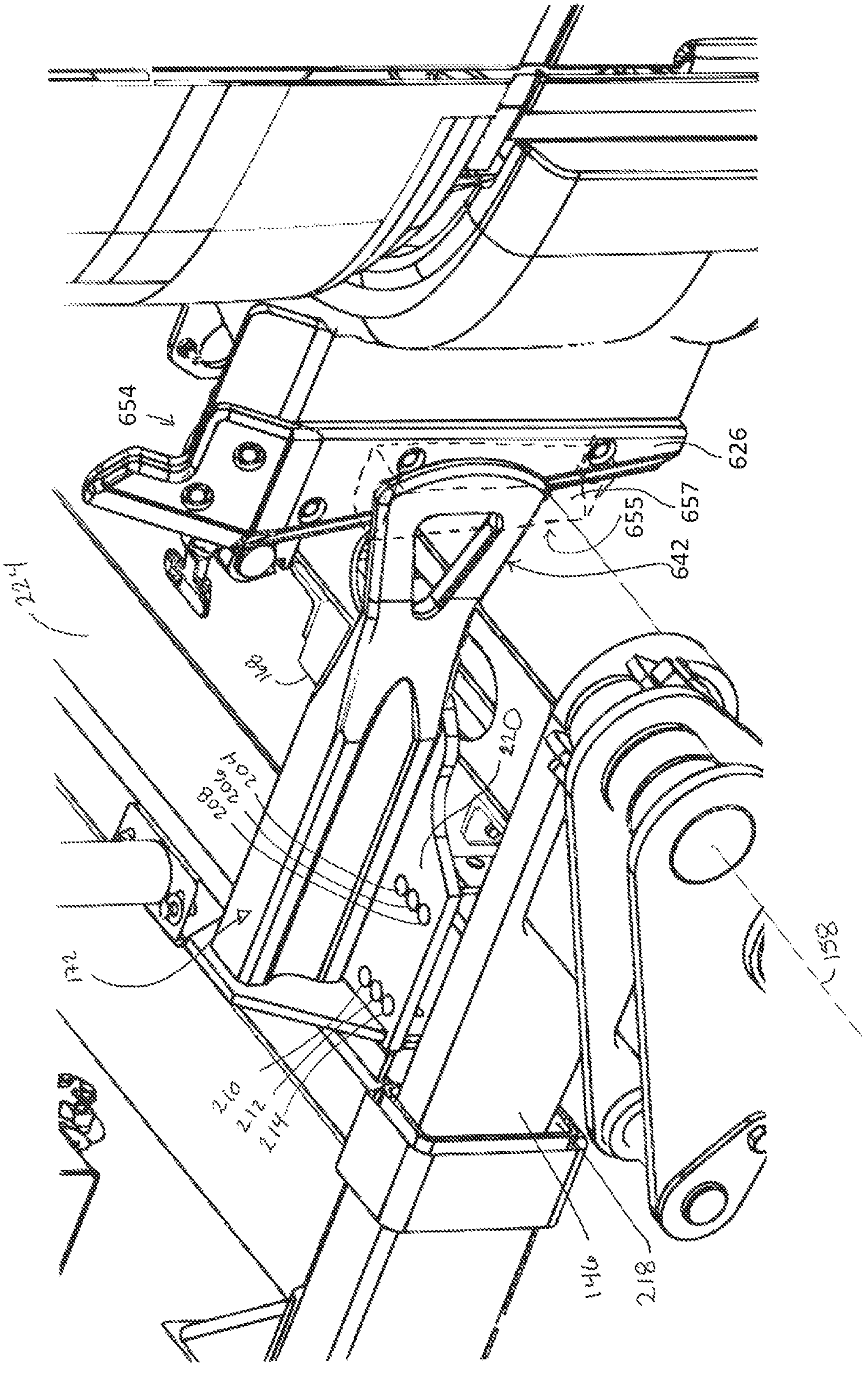
FIG. 6 is a rear perspective view of the left-handed portion of the embodiment of the area of detail shown in FIG. 5, the right-handed portion being substantially a mirror image thereof.
Figure 7:
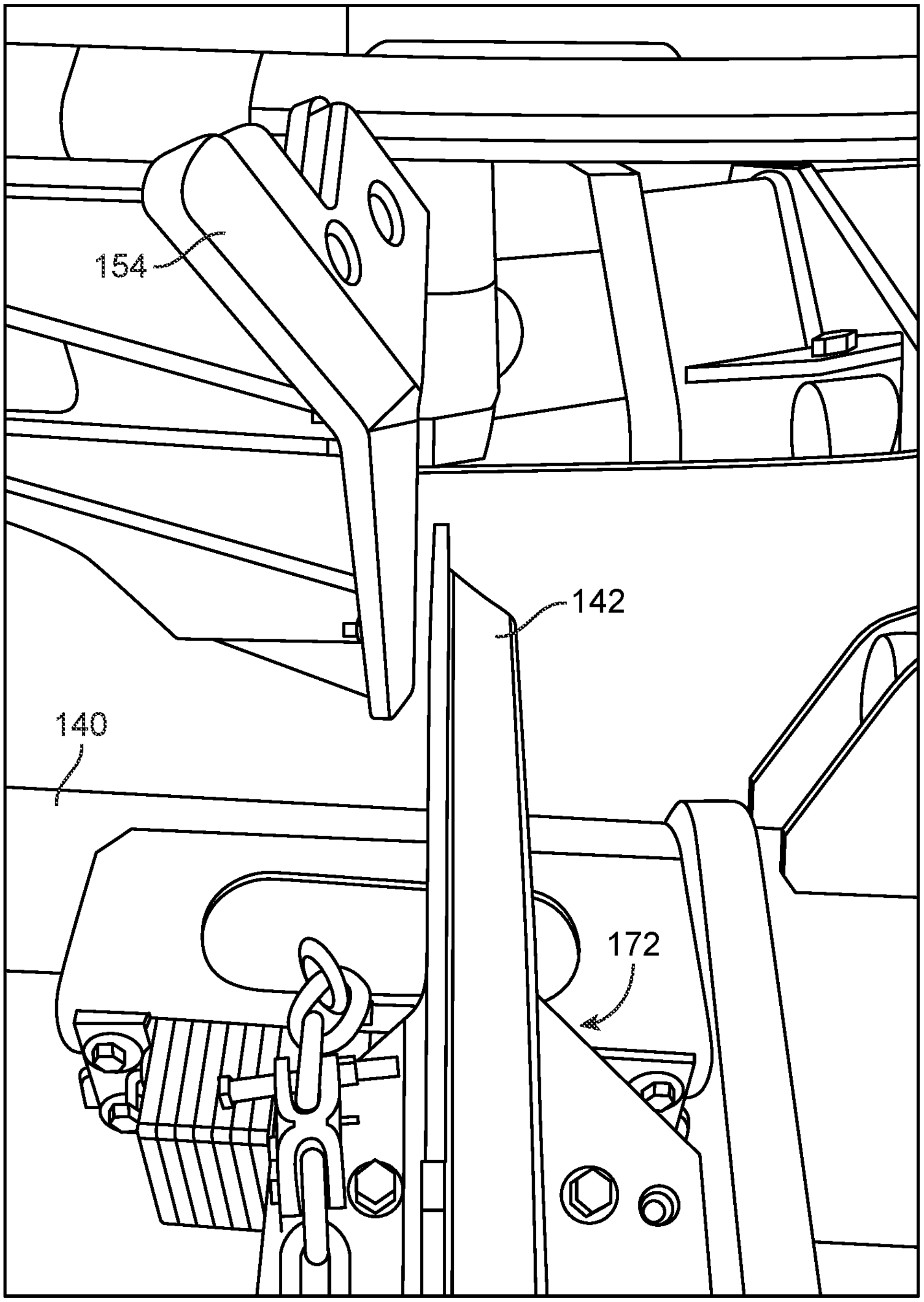
FIG. 7 is a top view of the left-handed portion of the embodiment shown in FIG. 5.

FIGS. 5-7 show detailed views of a portion of a vehicle 110 having a lift arm assembly 112 and fork mechanism 118 controlled similarly to the embodiment of FIGS. 1-4. Similar to the vehicle 10, vehicle 110 has a first chassis guide 154 (which may be similar or dissimilar to bumper guide 54). However, instead of having a first fin 42 operably coupled to a crossbar 40 of the lift arm assembly 12 of the vehicle 110, a first fin 142, 242 of vehicle 110 is connected directly to the collection device 120 in the embodiments depicted in FIGS. 5-7. In some implementations, a second fin (not shown) is similarly constructed to cooperate with a second chassis guide (such as 56 shown in FIG. 2).

Chassis bumper guides 54, 56 in FIG. 2 are located at a bottom of or below the cab 16 and may be laterally adjustable in position relative to chassis 26 such as with slots 102, 104 receiving connectors 106, 108 therethrough. As the vehicle operates, these connections may become loose allowing for undesired side to side movement of the guide(s) 54, 56. Lateral adjustment (i.e., parallel to crossbar axis 158) can be accomplished with guide 154 with slots, such as slot 202, but can also be addressed with orifices such as bores 204, 206, 208 in the fin assemblies, such as first fin assembly 172 illustrated in FIGS. 5 and 6. For example, parallel sets of orifices or bores 204, 206, 208 and 210, 212, 214 may be utilized with connectors similar to connectors 106, 108 therethrough to prevent skewing or other undesired effects. Utilizing bores 204-214 to connect the first chassis guide 154 to the first fin assembly 172 permits selective adjustability of the first fin 142 laterally in either first or second direction 160, 162, where the second direction 162 may be parallel with the crossbar axis 158 (extending through a center of crossbar 140) and extending directly opposite to first direction 160, relative to the first guide 154 and the refuse collection vehicle 110.

The first fin 142 selectively engages the first chassis guide 154 to thereby restrain lateral movement in at least the first direction 160. The second fin and second guide (not shown) can similarly restrain movement in the second direction 162, as would be understood by those of ordinary skill in the art. Other fin/guide constructions can include a single set of fin/guides to resist movement in both the first and second directions 160, 162.

When a residential refuse collection device 120 is coupled to the fork assembly, the forks of the fork assembly, such as fork 146 are usually received in pockets, such as fork pocket 218. When the forks 146 are coupled to the fork pockets 218 of the collection device 120 and the vehicle 110 is in Residential Mode, the first fin assembly 172 is located proximate to, if not adjacent to, the fork pocket 218. In some implementations, the first fin assembly 172 includes a base 220 with the orifices, illustrated as bores extending therethrough. Base 220 may be perpendicularly oriented relative to face 222 of first fin 142. The first fin assembly 172 may contact a container bumper 168 connected to the crossbar 140 when the vehicle 110 is in Residential Mode and the residential refuse collection device 120 is connected to the fork assembly (including fork 146). Fin assemblies such as 172 may be connected to the residential refuse collection device 120, such as at crossbeam 224, which can connect pockets. such as fork pocket 218, together with forks of the vehicle 110, such as fork 146.

The first fin 142 is illustrated extending rearwardly of the residential refuse collection device 120 toward the chassis 126. The first fin 142 may extend over the crossbar 140 and/or over the container bumper 168. The face 222 of first fin 142 is illustrated as having a vertically extending surface directed towards a vertically extending surface 226 of the first guide 154. In fact, the vertically extending surface of face 222 of the first fin 142 may contact the vertically extending surface 226 of the first guide 154 when the residential refuse collection device 120 is in the first position of the Residential Mode. The first fin 142 (and second fin, not shown) may be in a plane extending perpendicularly to the crossbar axis 158 for at least some embodiments.

The second fin (not shown) can be a mirror image of the first fin 142 and can cooperate with a second guide, not shown but a mirror image of the first guide 154, to resist side to side motion in the second direction 162 (i.e., lateral motion), preferably with a similar construction, placement, and connection of the second fin assembly and second fin relative to the collection device 120. These structures can be mirror images of those illustrated in FIGS. 5-7, or they can be constructed differently with these or different design objectives.

Some embodiments can also have a different number of fins than first and second fins. For example, FIG. 6 shows an example of some additional embodiments of a refuse collection container—vehicle connection that have only a single first fin 642 which may cooperate with a first guide 654 so as to resist movement in both directions 160, 162 parallel to crossbar axis 158, such as by providing a V-notch or receiving slot 655 integrated with first guide 654. First guide 654 can integrate the receiving slot 655 intermediate along vertically extending surface 626. In order to so resist any lateral movement, the integrated single first guide 654 can consist of a panel 657, as shown in FIG. 6, and said panel 657 can serve to restrict motion of the first fin 642 in both directions 160, 162.

Numerous alterations to and variants of the structures disclosed herein will suggest themselves to those skilled in the art. However, it is to be understood that the present disclosure relates to the preferred embodiment of the invention, which is for purposes of illustration only and not to be construed as a limitation of the invention. All such modifications which do not depart from the spirit of the invention are intended to be included within the scope of the appending claims.

What is claimed is:

1. A method of securing a refuse collection device in a working position at a front of a refuse collection vehicle, the method comprising:

adjusting a position of at least one fin coupled to a lift assembly of the refuse collection vehicle from a first position to a second position by rotating the at least one fin at least 30 degrees with respect to a crossbar of the refuse collection vehicle; and coupling the refuse collection device to the lift assembly of the refuse collection vehicle, wherein the at least one fin is configured to prevent movement of the refuse collection device in a first direction parallel to an axis extending along the crossbar of the lift assembly.

2. The method of claim 1, wherein the at least one fin comprises a first fin and a second fin.

3. The method of claim 2, wherein the first fin and the second fin are rotationally coupled to the crossbar.

4. The method of claim 2, wherein the first fin and the second fin are rearwardly directed from the refuse collection device in respective planes perpendicular to an axis extending along the crossbar when the first fin and the second fin are positioned in the second position.

5. The method of claim 2, further comprising:

securing a first fin assembly directly to the refuse collection device, the first fin assembly comprising:

the first fin; and at least one guide connected to a chassis of the refuse collection vehicle.

6. The method of claim 5, wherein coupling the refuse collection device to the lift assembly comprises:

selectively engaging the at least one guide by the at least one fin; and restraining movement of the refuse collection device in a first direction parallel to an axis extending axially through a center of the crossbar.

7. The method of claim 6, further comprising:

securing a second fin assembly directly to the refuse collection device, the second fin assembly comprising the second fin and a second guide connected to the chassis of the refuse collection vehicle; and restraining a motion of the refuse collection device in a second direction extending opposite the first direction by causing the second fin and the second guide cooperate with each other.

8. The method of claim 5, wherein:

the first fin assembly comprises a base comprising a plurality of orifices; and the method further comprises connecting the base to the refuse collection device via a connector received by at least one orifice of the plurality of orifices.

9. The method of claim 5, further comprising securing the at least one guide to a chassis of the refuse collection vehicle below a cab of the refuse collection vehicle.

10. The method of claim 5, wherein:

the at least one guide has a vertically extending surface; and the first fin has a vertically extending surface, wherein the vertically extending surfaces of the at least one guide and the first fin are parallel.

11. The method of claim 10, further comprising contacting the vertically extending surface of the first fin and the vertically extending surface of the at least one guide with one another.

12. The method of claim 5, wherein:

the first fin assembly further comprises a pin configured to secure the position of the first fin relative to the crossbar, the pin comprising a handle; and the adjusting the position of at least one fin comprises:

using the handle to disengage the pin while the first fin is in the first position; and after the first is adjusted from the first position to the second position, re-engaging the pin to secure the first fin in the second position.

13. The method of claim 5, wherein:

the first fin assembly comprises a slot integrated with the at least one guide; and securing the first fin assembly directly to the refuse collection device comprises inserting the fin into the slot such that a lateral movement of the fin is restricted.

14. The method of claim 1, wherein coupling the refuse collection device to the lift assembly comprises:

inserting a first fork of the lift assembly in a first pocket of the refuse collection device; and inserting a second fork of the lift assembly in a second pocket of the refuse collection device, wherein the first and second pockets are connected by a crossbeam.

15. The method of claim 1, wherein the adjusting the position of the at least one fin is performed automatically based on an output of one or more of a sensor, a mechanical mechanism, and an electrical mechanism.

16. The method of claim 1, wherein the at least one fin is adjusted from the first position to the second position in response to the refuse collection vehicle switching from a commercial mode to a residential mode.

17. The method of claim 1, wherein adjusting the position of at least one fin from the first position to the second position comprises rotating the at least one fin at least 45 degrees.

18. The method of claim 1, wherein adjusting the position of the at least one fin from the first position to the second position comprises using an interlock to prevent the at least one fin from contacting a portion of the refuse collection vehicle while in operation.

19. The method of claim 1, further comprising:

removing the refuse collection device from the lift assembly of the refuse collection vehicle; and rotating the at least one fin at least 30 degrees with respect to the crossbar of the refuse collection vehicle to adjust the position of the at least one fin from the second position to the first position.

20. The method of claim 19, wherein the adjusting the position of the at least one fin from the second position to the first position prevents the at least one fin from contacting a portion of the refuse collection vehicle while the lift assembly is in operation.

* * * * *